United States Patent [19]

Kramer

[11] Patent Number: 5,013,804
[45] Date of Patent: May 7, 1991

[54] CURABLE MIXTURES CONTAINING A BISMALEIMIDE AND A PROPENYL COMPOUND

[75] Inventor: Andreas Kramer, Düdingen, Switzerland

[73] Assignee: Ciba-Geigy Corporation, Ardsley, N.Y.

[21] Appl. No.: 505,097

[22] Filed: Apr. 3, 1990

[30] Foreign Application Priority Data

Apr. 14, 1989 [CH] Switzerland .......................... 1423/89

[51] Int. Cl.$^5$ .................... C08F 26/00; C08F 22/40; C08G 73/10
[52] U.S. Cl. ................... 526/262; 526/333; 526/334; 528/322
[58] Field of Search ......................... 526/262

[56] References Cited

U.S. PATENT DOCUMENTS

| | | | |
|---|---|---|---|
| 4,288,583 | 9/1981 | Zahir et al. ................. | 526/262 |
| 4,789,704 | 12/1988 | Stenzenberger et al. | |
| 4,835,232 | 5/1989 | Schornick et al. | |
| 4,871,821 | 10/1989 | Stenzenberger et al. | |
| 4,873,284 | 10/1989 | Ittemann et al. | |
| 4,917,954 | 4/1990 | Stenzenberger et al. | |

FOREIGN PATENT DOCUMENTS 0230741 8/1987 European Pat. Off.
0276737 8/1988 European Pat. Off.

OTHER PUBLICATIONS

H. D. Stenzenberger et al., 18th International Sampe Technical Conference, Oct. 7-9, pp. 500-509 (1986).

*Primary Examiner*—Joseph L. Schofer
*Assistant Examiner*—Wu C. Cheng
*Attorney, Agent, or Firm*—JoAnn Villamizar

[57] ABSTRACT

Curable mixtures containing
(a) an aromatic bismaleimide of formula

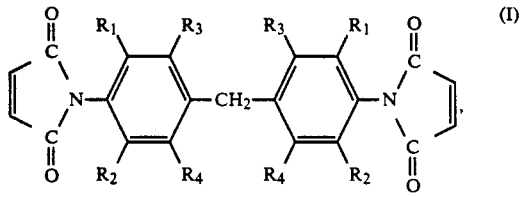

wherein $R_1$ and $R_2$ are identical or different and each is $C_1$-$C_4$alkyl, and $R_3$ and $R_4$ are each independently of the other a hydrogen or halogen atom, and (a) a propenyl compound of formula II

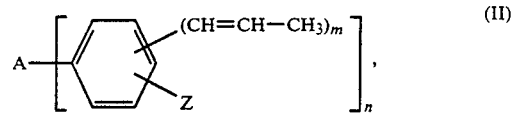

wherein m and n are each independently of the other 1 or 2, Z is a hydrogen atom or $C_1$-$C_4$alkoxy, and A is a radical of formula IIa, IIb or IIc

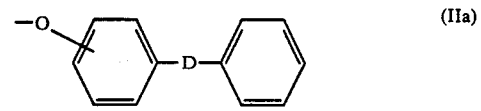

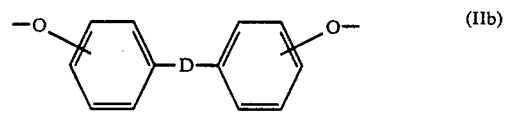

or

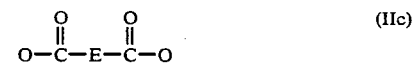

wherein D is $-SO_2-$ or $-CO-$ or is a radical of formula

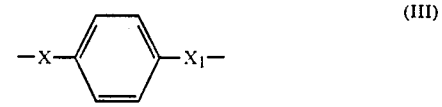

or

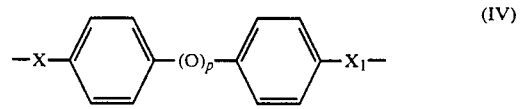

wherein X and $X_1$ are each independently of the other $-CO-$, $-SO_2-$ or $-O-$, and p is 0 or 1, E is phenylene or a radical of formula V

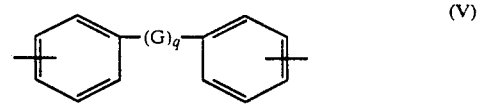

wherein G is

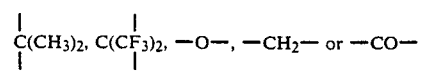

and q is 0 or 1, are readily processable, well suited for the preparation of prepregs or fibre-reinforced composites, and give mouldings having excellent fracture toughness.

10 Claims, No Drawings

CURABLE MIXTURES CONTAINING A BISMALEIMIDE AND A PROPENYL COMPOUND

The present invention relates to curable mixtures containing an aromatic alkyl-substituted bismaleimide and a propenyl compound and to the crosslinked and infusible products obtained therefrom by curing.

Curable mixtures based on aromatic bismaleimides and propenyl compounds are known, for example, from the publication by H. D. Stenzenberger et al., relating to allyl(propenyl)-terminated arylene ether sulfone oligomers as co-reactive intermediates for tough bismaleimides, 18th International SAMPE Technical Conference, Oct. 7-9, 1986, pp. 500-509, and from European patent application Nos. 0 230 741 and 0 276 737. In all these publications, no ring-substituted N,N-4'4'-methylenebis(phenylmaleimide) is used as bismaleimide or the use thereof recommended or suggested. These known curable mixtures are not entirely satisfactory in respect of processability, especially in the melt.

It has now been found that the use of aromatic methylenebis(phenylmaleimides) which are alkyl-substituted in o,o'-position to the imide group are more readily miscible with propenyl compounds, and that such curable compositions have longer, i.e. more favourable, processing times (pot life) at elevated temperature, for example at 120° C. The moulded articles prepared from the curable compositions of this invention have, in addition, enhanced toughness properties and enhanced moisture resistance.

Accordingly, the present invention relates to curable compositions comprising
(a) an aromatic bismaleimide of formula I

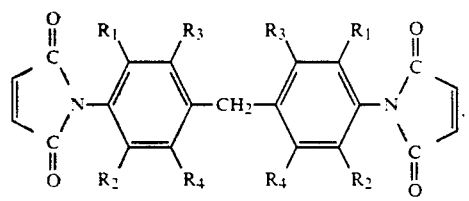

wherein $R_1$ and $R_2$ are identical or different and each is $C_1$-$C_4$alkyl, and $R_3$ and $R_4$ are each independently of the other a hydrogen or halogen atom, and
(b) a propenyl compound of formula II

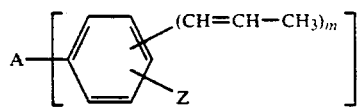

wherein m and n are each independently of the other 1 or 2, Z is a hydrogen atom or $C_1$-$C_4$alkoxy, and A is a radical of formula IIa, IIb or IIc

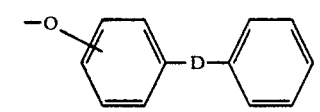   (IIa)

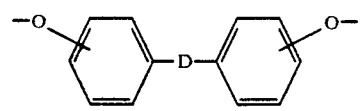   (IIb)

   (IIc)

wherein D is $-SO_2-$ or $-CO-$ or is a radical of formula

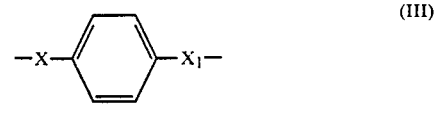   (III)

or

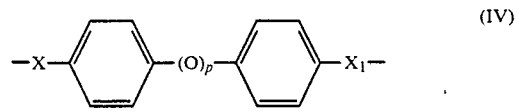   (IV)

wherein X and $X_1$ are each independently of the other $-CO-$, $-SO_2-$ or $-O-$, and p is 0 or 1, E is phenylene or a radical of formula V

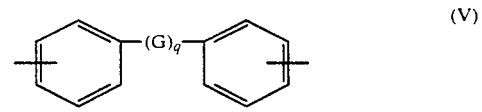   (V)

wherein G is

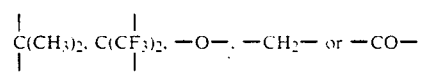

and q is 0 or 1.

The compositions of this invention normally contain 0.05 to 2 mol, preferably 0.5 to 1.2 mol, of component (b) per mol of component (a).

The compositions of this invention preferably contain as component (a) those aromatic bismaleimides of formula I, wherein $R_1$ and $R_2$ are each independently of the other methyl, ethyl or isopropyl, and $R_3$ and $R_4$ are each a hydrogen or a chlorine atom.

Most preferably, the compositions of this invention contain those bismaleimides of formula I, wherein $R_1$ and $R_2$ are each independently of the other methyl, ethyl or isopropyl, and $R_3$ and $R_4$ are each a hydrogen atom.

Suitable bismaleimides of formula I are typically
N,N'-4,4'-methylenebis(2-ethyl-6-methylphenylmaleimide) and
N,N'-4,4'-methylenebis(2,6-dimethylphenylmaleimide), which are particularly preferred compounds (a), as well as N,N'-4,4'-methylenebis(2,6-diethylphenylmaleimide),
N,N'-4,4'-methylenebis(2,6-diisopropylphenylmaleimide),
N,N'-4,4'-methylenebis(2-ethyl-6-isopropylphenylmaleimide), and
N,N'-4,4'-methylenebis(3-chloro-2,6-diethylphenylmaleimide).

It is also possible to use as component (a) a mixture of a bismaleimide of formula I and an unsubstituted bismaleimide of formula I ($R_1$ to $R_4$=H), in which mixture the amount of unsubstituted bismaleimide is up to ca. 60 mol%, based on the total amount of bismaleimides.

Some of the bismaleimides of formula I are known compounds and can be prepared, for example, by the process disclosed in Japanese Patent Kokai Sho No. 61-93159 by reacting 1 mol of a diamine of formula Ia

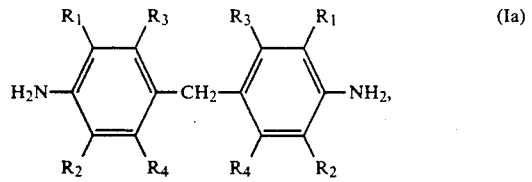 (Ia)

wherein $R_1$, $R_2$, $R_3$ and $R_4$ are as defined for formula I, with 2 mol of maleic anhydride, in an organic solvent, to the corresponding bismaleamic acid, and subsequently cyclising said acid with a condensing agent such as acetic anhydride, to the bismaleimide.

The diamines of formula Ia are known compounds and are disclosed, for example, in German Offenlegungsschrift No. 2 339 237 or in European patent application No. 0 171 588.

The mixtures of this invention preferably contain as component (b) a compound of formula II, wherein m is 1 or 2 and n is 1, Z is a hydrogen atom or methoxy, and A is a radical of formula IIb or IIc.

The mixtures of this invention preferably contain as component (b) a compound of formula II in which A is a radical of formula IIb, wherein D is —$SO_2$—, —CO—,

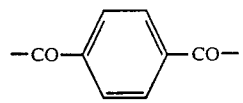

or a radical of formula IV, wherein X and $X_1$ are each —CO— or —$SO_2$— and p is 0.

The mixtures of this invention also preferably contain those compounds of formula II, wherein A is a radical of formula IIc, wherein E is phenylene or a radical of formula V, wherein q is 0.

Illustrative examples of suitable propenyl compounds of formula II are 4,4'-bis(o-propenylphenoxy)benzophenone and 4,4'-bis(o-propenylphenoxy)diphenyl sulfone, which are particularly preferred compounds for use as component (b), as well as the compounds of the following formulae

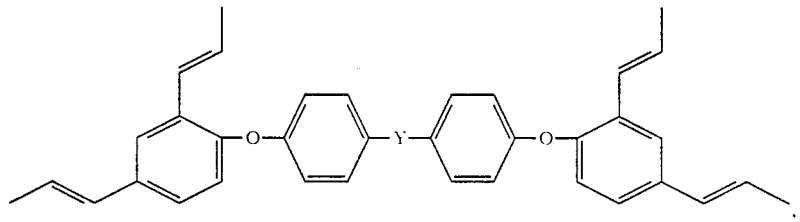

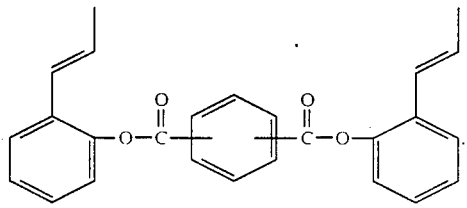

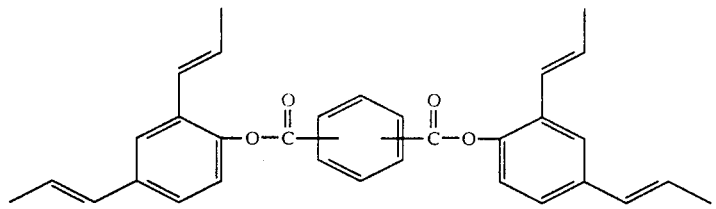

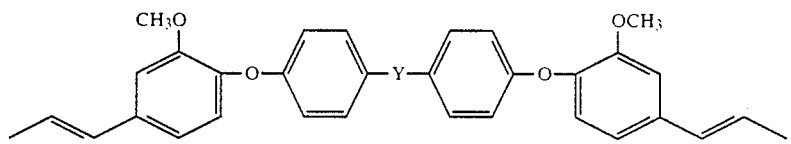

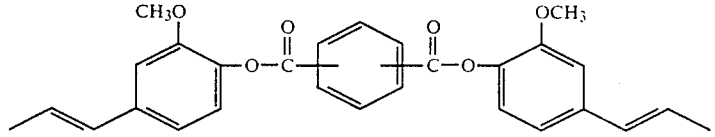

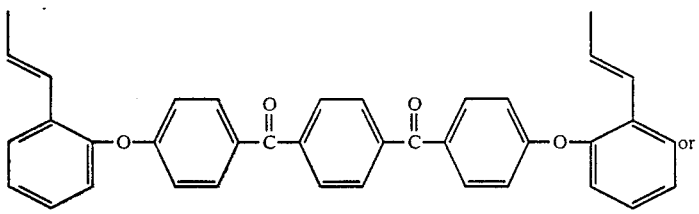

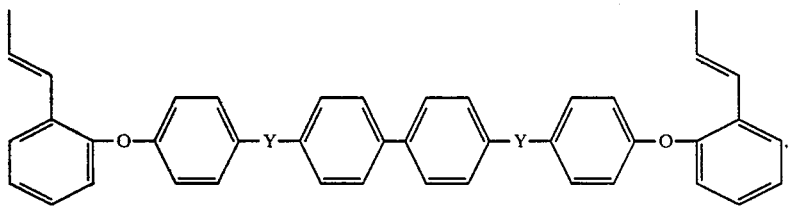

wherein Y is the radical

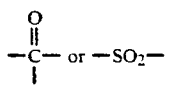

The propenyl compounds of formula II are known, for example from the SAMPE publication mentioned at the outset and from European patent application Nos. 0 230 741 and 0 276 737, and can be prepared by the process disclosed therein by reacting, for example, a dihalo compound of formula VI

 (VI)

wherein A and n are as defined for formula II and Hal is a halogen atom, preferably a chlorine atom, with an allyl phenol of formula VII

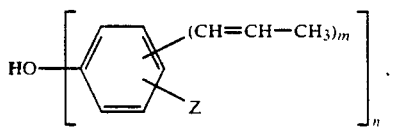 (VII)

wherein Z and n are as defined for formula II, in the presence of a base, to a compound of formula II.

The reaction is preferably carried out in the temperature range from 120° to 220° C. in an organic solvent such as dimethyl formamide, dimethyl acetamide, N-methylpyrrolidone or dimethyl sulfoxide, and in the presence of a base such as potassium carbonate, whereupon isomerisation of the allyl group to the propenyl group is known to take place.

The dihalo compounds of formula VI and the allyl phenols of formula VII, for example 2-allylphenol, 2,4-diallylphenol or eugenol, are also known compounds. Some of the propenyl compounds of formula II are also commercially available, for example under the trade name TM 123 (4,4'-bis(o-propenylphenoxy)benzophenone, and TM 122 (4,4'-bis(o-propenylphenoxy)diphenyl sulfone, supplied by Technochemie GmbH, Dossenheim, FRG.

The compositions of this invention may be prepared by merely mixing the components or by heating the mixture at a temperature in the range from 75°-130° C. for about 15 to 60 minutes. Solvents, preferably volatile solvents such as chlorinated hydrocarbons, esters, or tetrahydrofuran, may also be used to facilitate the reaction. The solvent is removed after the reaction.

Curing of the compositions is usually effected in the temperature range from 100°-280° C. for the appropriate period of time.

Upon curing, a network of high crosslink density occurs. Accordingly, the expression "cure" as used herein denotes the conversion of compositions into insoluble and infusible crosslinked products with simultaneous shaping to give shaped articles such as castings, pressings or laminates, or to give two-dimensional structures such as coatings, enamels and adhesive bonds. The coatings obtained are distinguished, for example, by enhanced toughness, especially fracture toughness.

The compositions of this invention can be mixed, at any stage before cure, with customary modifiers such as extenders, fillers and reinforcing agents. pigments, dyes, organic solvents. plasticisers. tackifiers, rubbers. accelerators or diluents. Illustrative of suitable extenders, reinforcing agents, fillers and pigments are: coal tar, bitumen, glass fibres, boron fibres, carbon fibres, cellulose, polyethylene powder, polypropylene powder, mica, asbestos, quartz powder, gypsum, antimony trioxide, bentones, silica aerogel ("aerosil"), lithopone, barite, titanium dioxide, carbon black, graphite, iron oxide or metal powders such as aluminium powder or iron powder. It is also possible to add other conventional modifiers to the curable compositions, for example flame retardants, thixotropic agents, flow control agents such as silicones, cellulose acetate butyrate, polyvinyl butyrate, waxes, stearates and the like (some of which may also be used as mould release agents).

If the compositions of this invention are used, for example, as adhesive formulations, it is also possible to add to them carboxyl-terminated acrylonitrile/butadiene rubber, modifying resins such as triglycidyl-p-aminophenol, and accelerators such as boron trifluoride monoethylamine complexes or imidazole complexes.

The curable compositions can be prepared in conventional manner with the aid of known mixing equipment such as stirrers, kneaders, rollers, and the like.

The compositions of this invention are very readily processable, have good solubility in customary organic solvents, good stability in the melt or in solution, as well as good thermal and mechanical properties of the products when cured, and in particular have excellent fracture toughness. The products obtained also have good electrical properties, high glass transition temperatures and are non-brittle. The compositions may also be readily used as melts, especially without the addition of non-volatile solvents, for example for impregnation.

Accordingly, the present invention also relates to the crosslinked, infusible products obtained by curing the compositions.

The compositions of this invention can be used in a variety of fields, for example in prepregs, laminates, composites, printed circuit boards, castings, mouldings, adhesives and coatings. A particularly interesting utility is the fabrication of fibre-reinforced composites, which are, for example, of very great importance in the aerospace industry. Thus the modified resins can be used for preimpregnating various fibrous materials which are used as honeycomb skins or as structural parts. Methods of preparing prepregs are known to the skilled person. Fibrous materials which may be suitably used are graphite, glass and kevlar. Methods of making laminates are also known. Laminates of different thicknesses can be made, for example by compression moulding or autoclave moulding. The compositions of the invention may also be used with success as adhesion promoters.

The following Examples describe a number of preferred embodiments of the invention.

Preparation of
N,N'-4,4'-methylenebis(2-ethyl-6-methylphenylmaleimide)

A solution of 1.0 mol of bis(4-amino-2-ethyl-6-methylphenyl)methane in 1000 ml of acetone is added dropwise at 0° C. over 1 hour to a solution of 216 g of maleic anhydride in 2000 ml of acetone. The reaction mixture is stirred for 2 hours at room temperature and then 780 ml of acetic anhydride, 90 ml of triethylamine and 14.4 g of nickel(II) acetate tetrahydrate are added. After 20 hours at room temperature ca. ⅔ of the acetone is removed by vacuum distillation. With stirring, the residue is poured into 5 litres of water, and the precipitate is isolated by filtration, washed repeatedly with water and dried in a vacuum drier at 70° C. Yield: 415 g (94% of theory). Melting point (DSC): 153° C.

EXAMPLE 1

8.85 g (0.02 mol) of N,N'-4,4'-methylenebis(2-ethyl-6-methylphenylmaleimide) and 8.93 g (0.02 mol) of (4,4'-bis(o-propenylphenoxy)benzophenone (TM 123, commercial product supplied by Technochemie GmbH, Dossenheim, FRG) are fused at 150° C. Differential thermoanalysis[1] shows that the reaction onset $T_A$ of the reddish-yellow mixture, which is solid at room temperature, is at 170° C. and the maximum peak temperature $T_{max}$ is 276° C. The integral heat of reaction $\Delta H$ of the cure is 300 J/g. The resin, which is mobile at 150° C., is poured into a test tube and cured for 4 hours (h) at 200° C., for 1 h at 220° C., and for 6 h at 250° C. A void-free transparent solid with a $T_g$[2] onset (TMA) of 300° C. is obtained.

[1] measured with a TA 3000 supplied by Mettler AG, CH-Greifensee
[2] Tg onset = point of intersection of the extended base line with the tangent at the calibration curve in the area of the steepest ascent (measured with TMA-943, DuPont 9900, thermoanalysis).

EXAMPLES 2-4

Further mixtures are prepared and processed to polymers in accordance with the process described in Example 1. The composition of these mixtures, their properties and the glass transition temperature after curing are indicated in Table I.

TABLE 1

| Example | 2 | 3 | 4 |
|---|---|---|---|
| N,N'-4,4'-methylenebis(2-ethyl-6-methylphenylmaleimide) | 13.3 g (0.03 mol) | — | 11.1 g (0.025 mol) |
| N,N'-4,4'-methylenebis(2,6-dimethylphenylmaleimide) | — | 10.4 g (0.025 mol) | — |
| 4,4'-bis(o-propenylphenoxy)benzo-phenone | 6.7 g (0.015 mol) | 11.2 g (0.025 mol) | — |
| 4,4'-bis(o-propenylphenoxy)diphenyl-sulfone (TM 122, ex Technochemie GmbH) | — | — | 12.1 g (0.025 mol) |
| Viscosity at 120° C. (mPas) | 997 | 2070 | 730 |
| DSC: $T_A$ (°C.) | 168 | 170 | 142 |
| $T_{max}$ (°C.) | 274 | 246/320 | 302 |
| $\Delta H$ (kJ/kg) | 239 | 184 | 235 |
| Tg onset (TMA) (°C.) | | | |
| (a) | 306 | 257 | 240 |
| (b) | | 260 | 241 |

(a) Cure: 4 h at 200° C., 2 h at 220° C. and 6 h at 250° C.
(b) Cure: 4 h at 200° C., 2 h at 220° C. and 6 h at 280° C.

What is claimed is:
1. A curable composition comprising
(a) an aromatic bismaleimide of formula

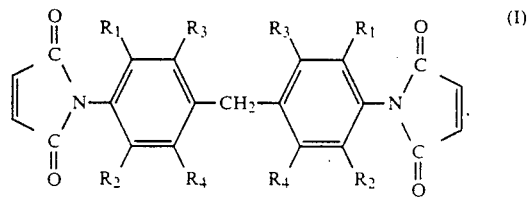

wherein $R_1$ and $R_2$ are identical or different and each is $C_1$-$C_4$alkyl, and $R_3$ and $R_4$ are each independently of the other a hydrogen or halogen atom, and (b) a propenyl compound of formula II

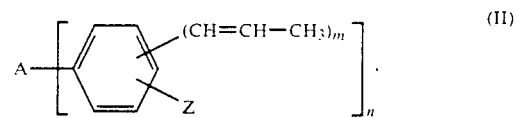

wherein m and n are each independently of the other 1 or 2, Z is a hydrogen atom or $C_1$-$C_4$alkoxy, and A is a radical of formula IIa, IIb or IIc

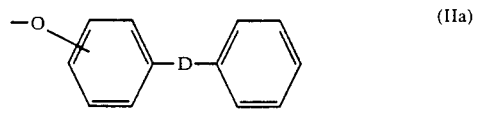

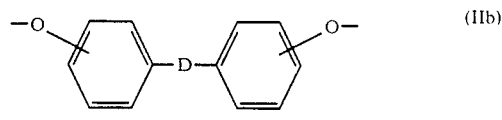

or

wherein D is —$SO_2$— or —CO— or is a radical of formula

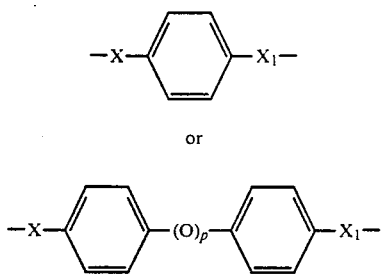

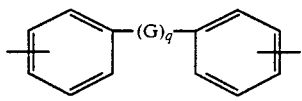

wherein X and $X_1$ are each independently of the other —CO—, —$SO_2$— or —O—, and p is 0 or 1, E is phenylene or a radical of formula V

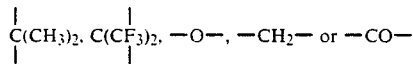

wherein G is $C(CH_3)_2$, $C(CF_3)_2$, —O—, —$CH_2$— or —CO— and q is 0 or 1.

2. A composition according to claim 1, which contains 0.05 mol, preferably 0.5 to 1.2 mol, of component (b) per mol of component (a).

3. A composition according to claim 1, wherein $R_1$ and $R_2$ are each independently of the other methyl, ethyl or isopropyl, and $R_3$ and $R_4$ are each a hydrogen or a chlorine atom.

4. A composition according to claim 1, wherein $R_1$ and $R_2$ are each independently of the other methyl, ethyl or isopropyl, and $R_3$ and $R_4$ are each a hydrogen atom.

5. A mixture according to claim 1, wherein component (a) is N,N-4',4'-methylenebis(2-ethyl-6-methylphenylmaleimide) or N,N-4',4'-methylenebis(2,6-dimethylphenylmaleimide).

6. A mixture according to claim 1 which contains a compound of formula II, wherein m is 1 or 2 and n is 1, Z is a hydrogen atom or methoxy, and A is a radical of formula IIb or IIc.

7. A mixture according to claim 6 which contains a compound of formula II, wherein A is a radical of formula IIb, wherein D is

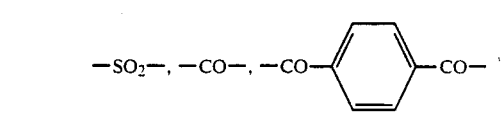

or a radical of formula IV, wherein X and $X_1$ are each —CO— or —$SO_2$— and p is 0.

8. A mixture according to claim 6 which contains a compound of formula II, wherein A is a radical of formula IIc, wherein E is phenylene or a radical of formula V, wherein q is 0.

9. A mixture according to claim 1, wherein component (b) is 4,4'-bis(o-propenylphenoxy)benzophenone or 4,4'-bis(o-propenylphenoxy)diphenyl sulfone.

10. A crosslinked, infusible product obtained by curing a composition as claimed in claim 1.

* * * * *